United States Patent
Alvarez et al.

(10) Patent No.: US 10,222,142 B2
(45) Date of Patent: Mar. 5, 2019

(54) HEAT EXCHANGER DESIGNS USING VARIABLE GEOMETRIES AND CONFIGURATIONS

(71) Applicant: HONEYWELL INTERNATIONAL INC., Morris Plains, NJ (US)

(72) Inventors: Jorge D Alvarez, Buena Park, CA (US); Douglas Czaplicki, Culver City, CA (US); Karl Fleer, San Pedro, CA (US); Mark C Morris, Phoenix, AZ (US); Donald G Godfrey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 38 days.

(21) Appl. No.: 15/442,830

(22) Filed: Feb. 27, 2017

(65) Prior Publication Data

US 2017/0167805 A1   Jun. 15, 2017

Related U.S. Application Data (62) Division of application No. 14/304,020, filed on Jun. 13, 2014.

(51) Int. Cl.
| | | |
|---|---|---|
| *F28F 9/02* | (2006.01) | |
| *F28D 9/00* | (2006.01) | |
| *F28D 9/02* | (2006.01) | |
| *B33Y 80/00* | (2015.01) | |
| *F02C 7/047* | (2006.01) | |
| *F28D 21/00* | (2006.01) | |

(Continued)

(52) U.S. Cl.
CPC ............ *F28F 9/0268* (2013.01); *B33Y 80/00* (2014.12); *F02C 7/047* (2013.01); *F28D 9/0081* (2013.01); *F28D 9/02* (2013.01); *F01D 25/02* (2013.01); *F02C 7/185* (2013.01); *F04D 27/009* (2013.01); *F04D 29/582* (2013.01); *F05D 2260/213* (2013.01); *F05D 2260/2214* (2013.01); *F28D 2021/0021* (2013.01); *F28F 2215/04* (2013.01); *Y02T 50/675* (2013.01)

(58) Field of Classification Search
CPC .. F28F 13/06; F28F 13/08; F28F 13/14; F28F 3/022; F28F 3/048
See application file for complete search history.

(56) References Cited

U.S. PATENT DOCUMENTS 5,400,854 A * 3/1995 Iio .................... F28D 9/0043
165/157
6,318,455 B1   11/2001 Nakado
(Continued)

FOREIGN PATENT DOCUMENTS

| DE | 10013440 C1 | 8/2001 |
|---|---|---|
| EP | EP1088578 | 8/2000 |

*Primary Examiner* — Eric Ruppert
(74) *Attorney, Agent, or Firm* — Shimokaji IP (57) ABSTRACT

A heat exchanger may include at least one fluid passageway adjacent a heat transfer plate and a plurality of heat transfer elements positioned in the at least one fluid passageway and joined with the heat transfer plate. The heat transfer elements may be positioned with first spacings therebetween at an inlet end of the at least one fluid passageway. The heat transfer elements may be positioned with second spacings therebetween at an outlet end of the at least one fluid passageway. The first spacings may be smaller than the second spacings.

7 Claims, 8 Drawing Sheets

(51) Int. Cl.
*F01D 25/02* (2006.01)
*F02C 7/18* (2006.01)
*F04D 27/00* (2006.01)
*F04D 29/58* (2006.01)

(56) References Cited

U.S. PATENT DOCUMENTS

| | | |
|---|---|---|
| 7,163,052 B2 | 1/2007 | Taras et al. |
| 2006/0250776 A1 | 11/2006 | Abul-Haj et al. |
| 2007/0227707 A1 | 10/2007 | Sridhar et al. |
| 2008/0011462 A1 | 1/2008 | Tasaki |
| 2011/0290446 A1 | 12/2011 | Kuchnel |
| 2013/0112373 A1 | 5/2013 | Fukai et al. |
| 2013/0232991 A1 | 9/2013 | Otero |
| 2013/0236299 A1 | 9/2013 | Kington et al. |

\* cited by examiner

HEAT EXCHANGER DESIGNS USING VARIABLE GEOMETRIES AND CONFIGURATIONS

RELATED APPLICATION

This application is a Divisional Application of U.S. patent application Ser. No. 14/304,020, filed Jun. 13, 2014 and claims the benefit of the filing date of that application.

BACKGROUND OF THE INVENTION

The present invention generally relates to heat exchangers and, more specifically, to heat exchangers employed in applications that involve high temperature differentials and high pressures.

Heat exchangers employed in high temperature applications may be subject to various stresses which may cause damage and ultimately failure. For example, high stress heat exchangers may be employed in aircraft to cool bleed air from an engine compressor. In these circumstances, bleed air may emerge from an engine at temperatures in excess of 1000° F. The bleed air may enter a heat exchanger for cooling with ambient air so that the bleed air may be safely utilized in an aircraft environmental control system (ECS). At a typical cruise altitude of an aircraft, ambient air may have a temperature as low as negative 60° F. Thus, various elements of such a heat exchanger may be exposed to an operating temperature differential of almost 1100° F.

In conventional heat exchangers, various elements are joined together with welded or brazed joints. These joints are subjected to thermal stresses when they are exposed to temperature differentials. The joints may also be subjected to stresses when air or fluid is introduced into the heat exchanger at high pressure. Collectively these stresses may cause fatigue-induced failure of the joints. Such failures may cause leakage in the heat exchanger and ultimately may shorten overall life-span of the heat exchanger.

It has been found that tubular type heat exchangers, as compared to plate-fin type heat exchangers, may have a higher tolerance for operating in conditions that produce high pressure and high temperature differentials. On the other hand, tubular type heat exchangers are typically more costly to manufacture and typically have a higher weight than their fin type counterparts.

In some aircraft applications, heat exchangers may be subject to ice formation when an aircraft is allowed to remain idle at ground level in a cold environment. Ice may form on closely spaced fins as water vapor condenses after cessation of airflow through the heat exchanger. When the aircraft is re-started, operation of the heat exchangers must be delayed until the heat exchanger is de-iced.

As can be seen, there is a need for heat exchangers that have a high tolerance for operating under conditions that involve high temperature differentials and/.or high pressures. Moreover there is a need for a plate-fin type heat exchanger that may meet or exceed capabilities of a tubular-type heat exchanger. Further still, there is a need for a heat exchanger that may be rapidly de-iced when employed in an aircraft

SUMMARY OF THE INVENTION

In one aspect of the present invention, a heat exchanger may comprise: at least one fluid passageway adjacent a heat transfer plate; and a plurality of heat transfer elements positioned in the at least one fluid passageway and joined with the heat transfer plate, the heat transfer elements being positioned with first spacings therebetween at an inlet end of the at least one fluid passageway, the heat transfer elements being positioned with second spacings therebetween at an outlet end of the at least one fluid passageway, and the first spacings being smaller than the second spacings.

In another aspect of the present invention, apparatus for cooling bleed air extracted from an aircraft engine may comprise: at least one fluid passageway adjacent a heat transfer plate; a plurality of fins positioned in the at least one fluid passageway and joined with the heat transfer plate; and at least one de-icing channel formed in the at least one fluid passageway, wherein none of the fins are present in the at least one de-icing passageway, wherein the at least one de-icing channel extends from an inlet end to an outlet end of the at least one fluid passageway, and wherein a length of the at least one de-icing channel is greater than a length of the at least one fluid passageway.

In still another aspect of the present invention, a method for cooling bleed air may comprise the steps: passing bleed air through first fluid passageways of a heat exchanger, the second fluid passageways being thermally coupled with the first fluid passageways; and passing ambient air through second fluid passageways of the heat exchanger, wherein the step of passing bleed air through the first fluid passageways may comprise, a) passing bleed air around first fins having a first thickness at an inlet end of the first fluid passageways so the first fins absorb heat at a maximum temperature differential of the heat exchanger, and b) passing bleed air around second fins having a second thickness, less than the first thickness, at an outlet end of the first fluid passageways so that the second fins produce less bleed air pressure drop than the first fins.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally provides heat exchangers in which heat transfer elements may be constructed with varying shapes and spacings to facilitate heat exchange between fluids at high temperature differentials with minimal thermal and pressure induced stress. More particularly, the present invention provides fin type heat exchangers wherein fins may be connected to plates with filleted connections. Further still, the present invention may provide heat exchangers that may be rapidly de-iced.

Figure 1:
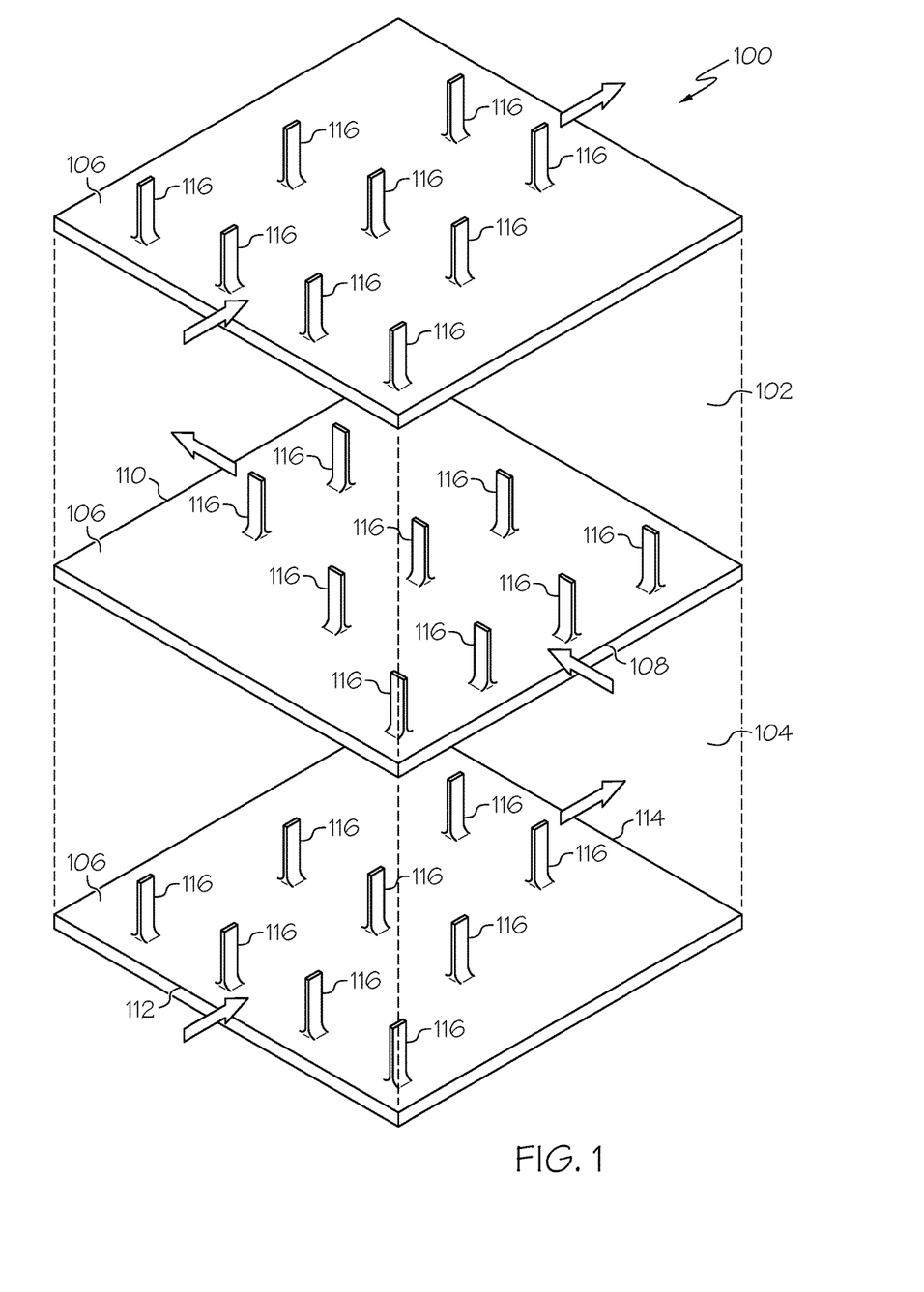
FIG. 1 is a simplified exploded view of a heat exchanger in accordance with an embodiment of the invention.

Referring now to FIG. 1, there is shown a simplified exploded view of a portion of an exemplary embodiment of a heat exchanger 100. The heat exchanger 100 may include a first fluid passageway 102 and a second fluid passageway 104. By way of example, the first fluid passageway 102 may allow for passage of bleed air from an aircraft engine (not shown) and the second fluid passageway 104 may allow for passage of ambient air in which the aircraft (not shown) may be operating. The fluid passageways 102 and 104 may be separated from another with heat transfer plates 106. The first fluid passageway 102 may have an input end 108 and an output end 110. The second fluid passageway 104 may have an input end 112 and an output end 114. Each of the heat transfer plates 106 may have a plurality of heat transfer elements or fins 116 connected and oriented orthogonally to the heat transfer plates 106.

Figure 2:
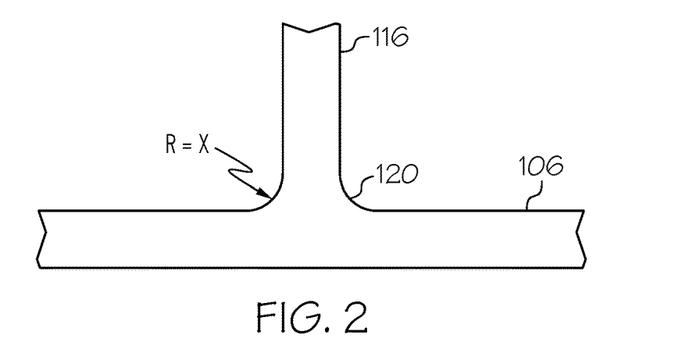
FIG. 2 is a partial cross sectional view of a small-radius filleted joining location of a heat transfer fin in accordance with an embodiment of the invention.
Figure 3:
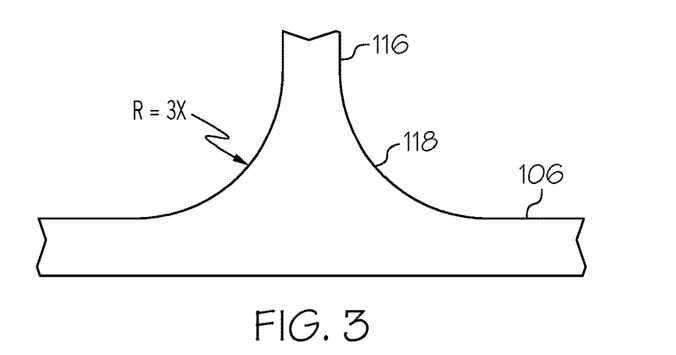
FIG. 3 is a partial cross sectional view of a large-radius filleted joining location of a heat transfer fin in accordance with a second embodiment of the invention.
Figure 4:
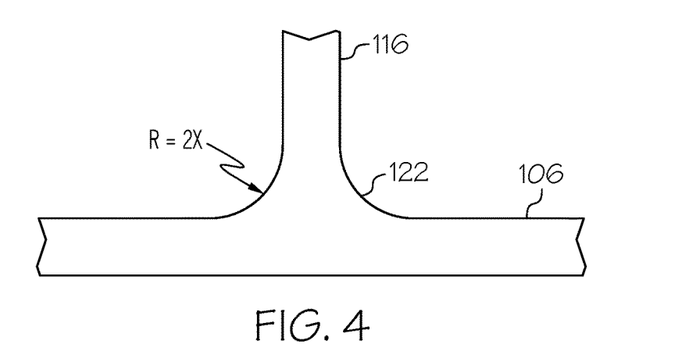
FIG. 4 is a partial cross sectional view of an intermediate-radius filleted joining location of a heat transfer fin in accordance with an embodiment of the invention.

Referring now to FIGS. 2, 3 and 4, it may be seen that the fins 116 may be connected to their respective ones of the heat transfer plates 105 with filleted connections. Construction of the plates 106 and the fins 116 may be performed by employing an additive layer fabrication system such as that described in US Published Patent Application 20130236299, dated Sep. 13, 2013, which application is incorporated by reference herein.

It may be noted that a large-radius fillet 118 may be employed at connections between the fins 116 and the plates 106 at the inlet end 108 of the fluid passageway 102. Even though the large-radius fillets 118 may increase a pressure drop in incoming bleed air, the large-radius fillets 118 may provide counterbalancing advantages. Temperature differential and a potential for thermal stress is at its highest at the inlet end 114. A large fillet radius may have the desirable effect of offsetting or minimizing thermal stress.

It may also noted that small-radius fillets 120 may be employed at connections between the fins 116 and the plates 106 at or near the outlet end 110 of the fluid passageway 102. As compared to the inlet end 108, temperature differentials are lower at the outlet end of the fluid passageway 102. Consequently, thermal stresses may be lower and the small-radius fillets 120 may have less of a pressure-drop inducing effect.

At positions intermediate between the inlet end 108 and the outlet end 110 of the fluid passageway, the fins 116 may be connected with intermediate radius fillets 112 such as those illustrated in FIG. 4. Here again, the radius of the fillets 122 may be selected to achieve a desirable balance between stress reduction and induced pressure drop.

Figure 5:
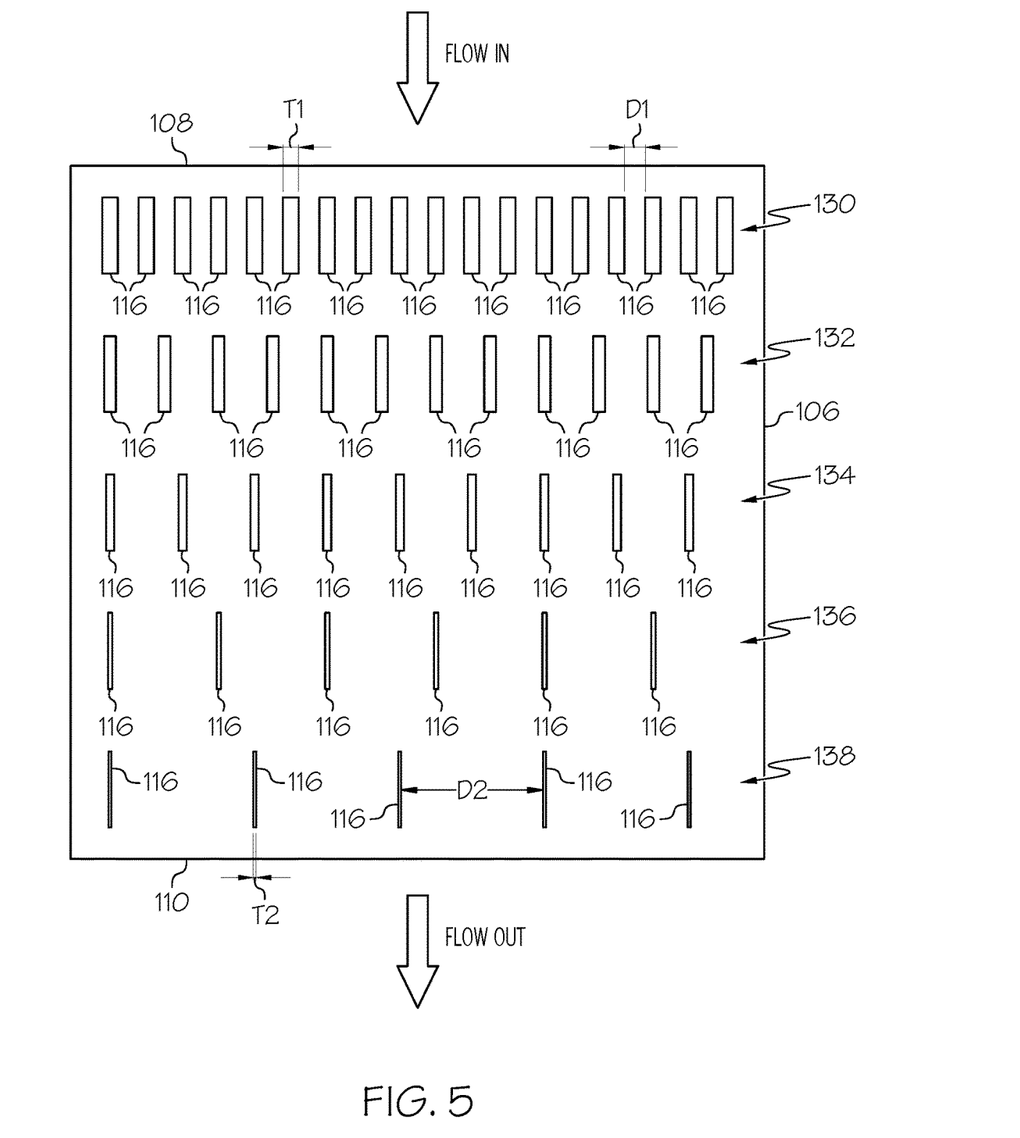
FIG. 5 is simplified plan view of a heat transfer plate and fins in accordance with an embodiment of the invention.

Referring now to FIG. 5, there is shown a simplified view of a pattern of fin placement on one of the heat transfer plates 106. In the exemplary embodiment of FIG. 5, it may be seen that the fins 116 located at or near the inlet end 108 may be spaced apart from one another by a distance D1. In comparison, the fins 116 located at or near the outlet end 110 may be spaced apart from one another by a larger distance D2. The fins 116 may be arranged in successive rows, for example rows 130, 132, 134, 136 and 138. Spacing between the fins 116 may progressively increase within each successive row. For example, fin spacing in row 132 may be greater than fin spacing in row 130. Similarly, fin spacing in row 134 may be greater than fin spacing in row 132. In other words, fin spacing may progressively increase in the direction of fluid flow from the inlet end 108 to the outlet end 110. While FIG. 5 may illustrate five exemplary rows, it should be noted that any number of rows may be placed between the inlet end 108 and the outlet end 110.

It may be seen that the fins 116 located at or near the inlet end 108 may have a thickness T1. In comparison, the fins 106 located at or near the outlet end 110 may have a smaller thickness T2. Thickness of the fins 116 may progressively decrease within each successive row. For example, fin thickness in row 132 may be less than fin thickness in row 130. Similarly, fin thickness in row 134 may be less than fin thickness in row 132. In other words, fin thickness may progressively decrease in the direction of fluid flow from the inlet end 108 to the outlet end 110.

Figure 6:
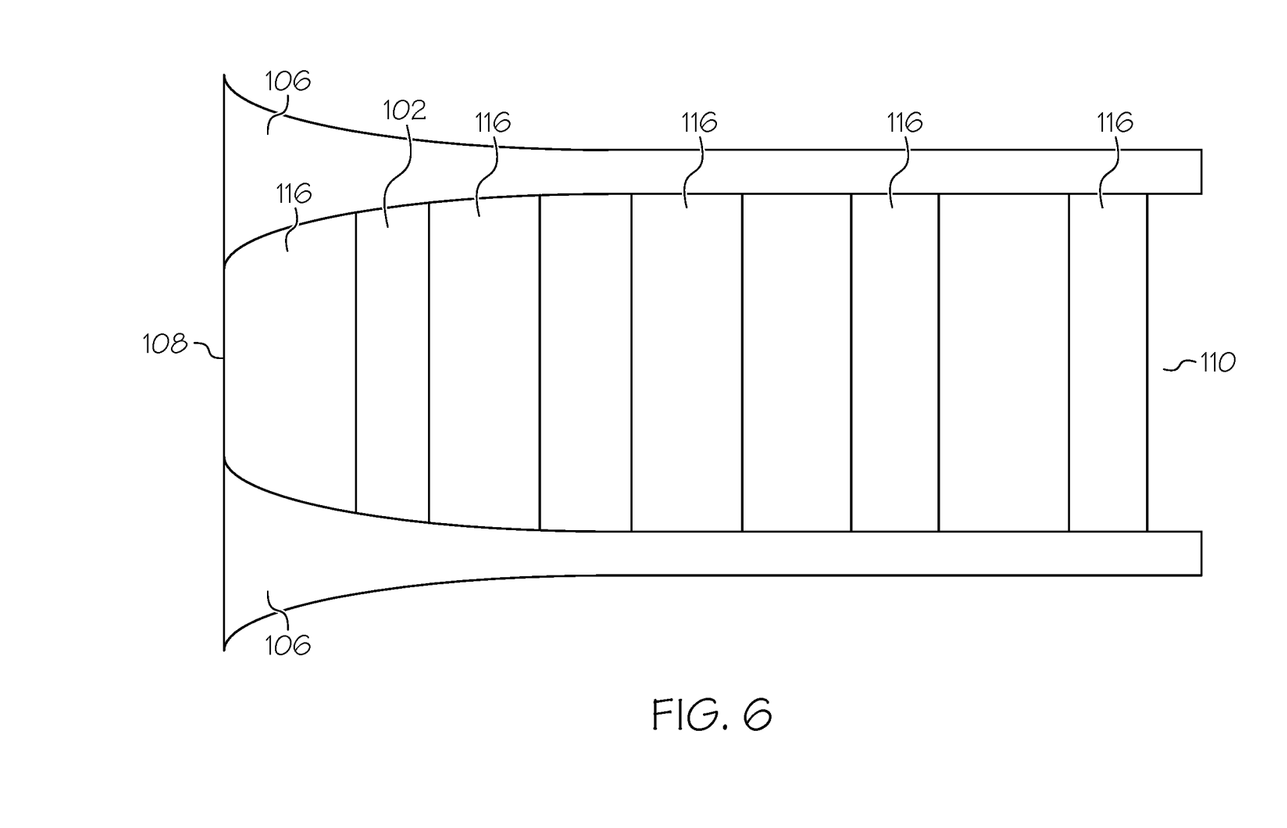
FIG. 6 is a partial cross-sectional view of a variable-height fluid passageway of a heat exchanger in accordance with an exemplary embodiment of the invention.

Referring now to FIG. 6, it may be seen that in an exemplary embodiment, the heat transfer plate 106 may have a varying thickness along its length in the direction of fluid flow. The plate 106 may be thickest at the inlet end 108 and thinnest at the outlet end 110. Additionally, heights of the fins 116 may vary progressively from row to row. Consequently the fluid passageways 102 and/or 104 may have a varying height along their respective lengths.

Figure 7:
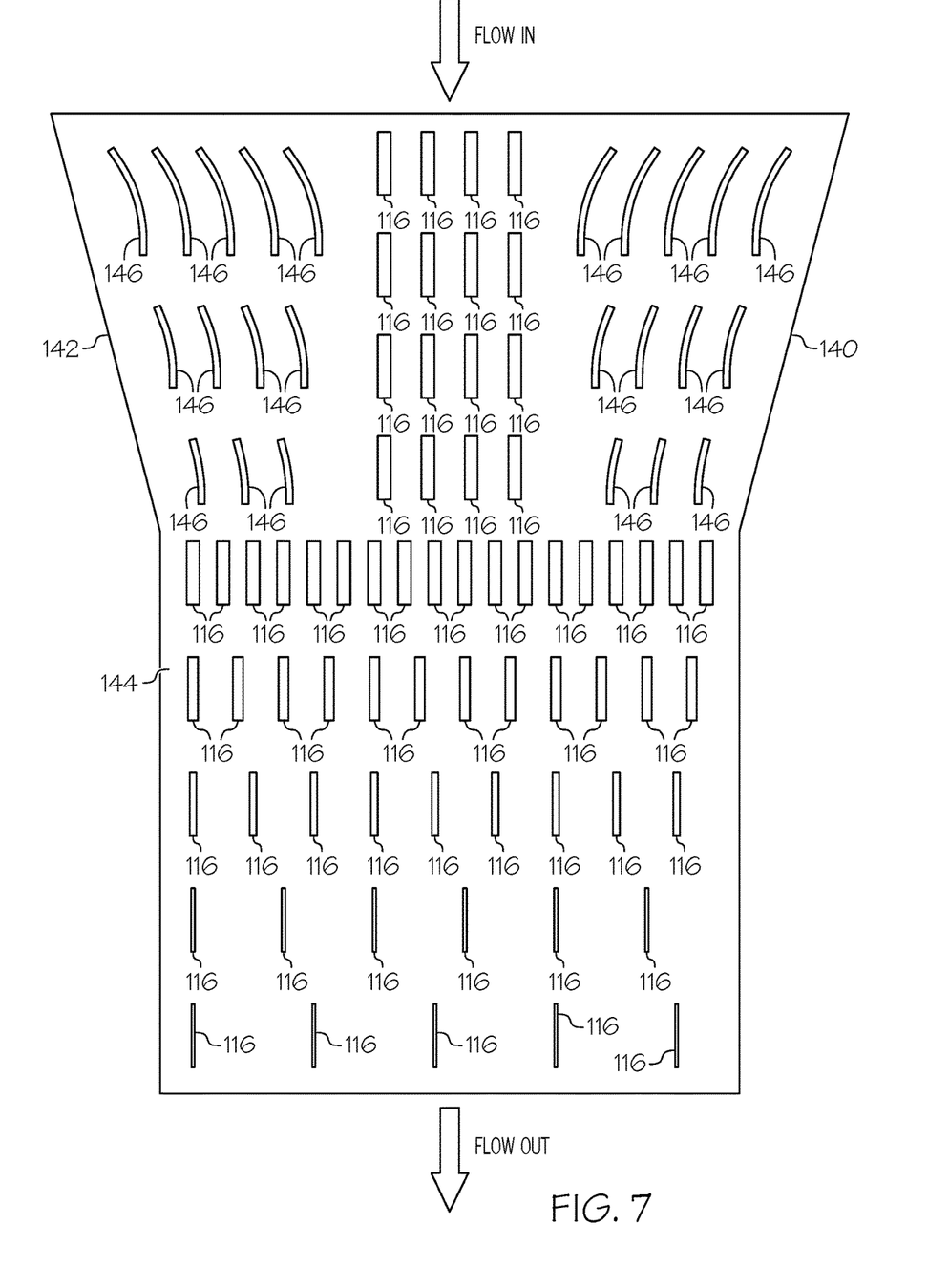
FIG. 7 is simplified plan view of a heat transfer plate and fins in accordance with a second embodiment of the invention.
Figure 8:
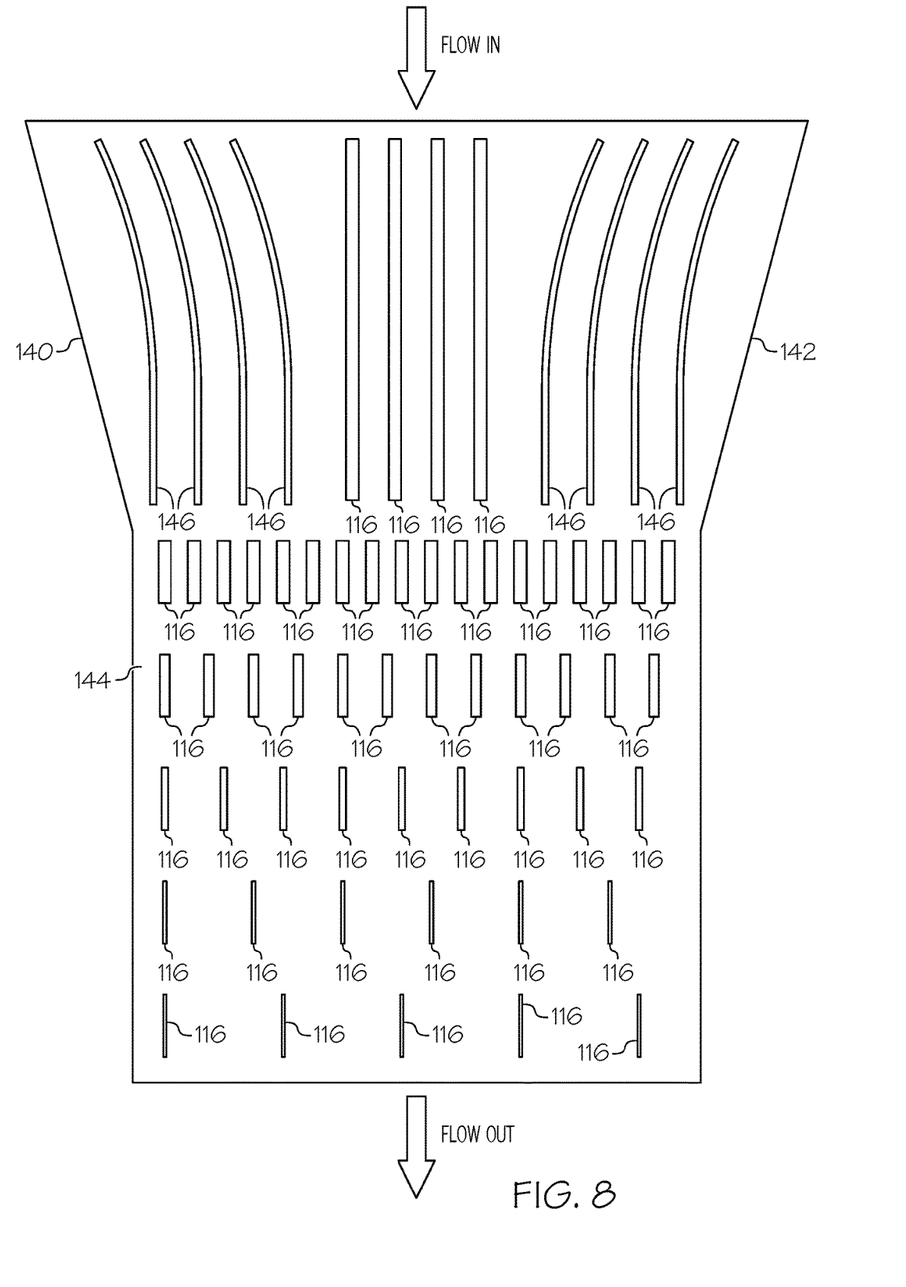
FIG. 8 is simplified plan view of a heat transfer plate and fins in accordance with a third embodiment of the invention.
Figure 9:
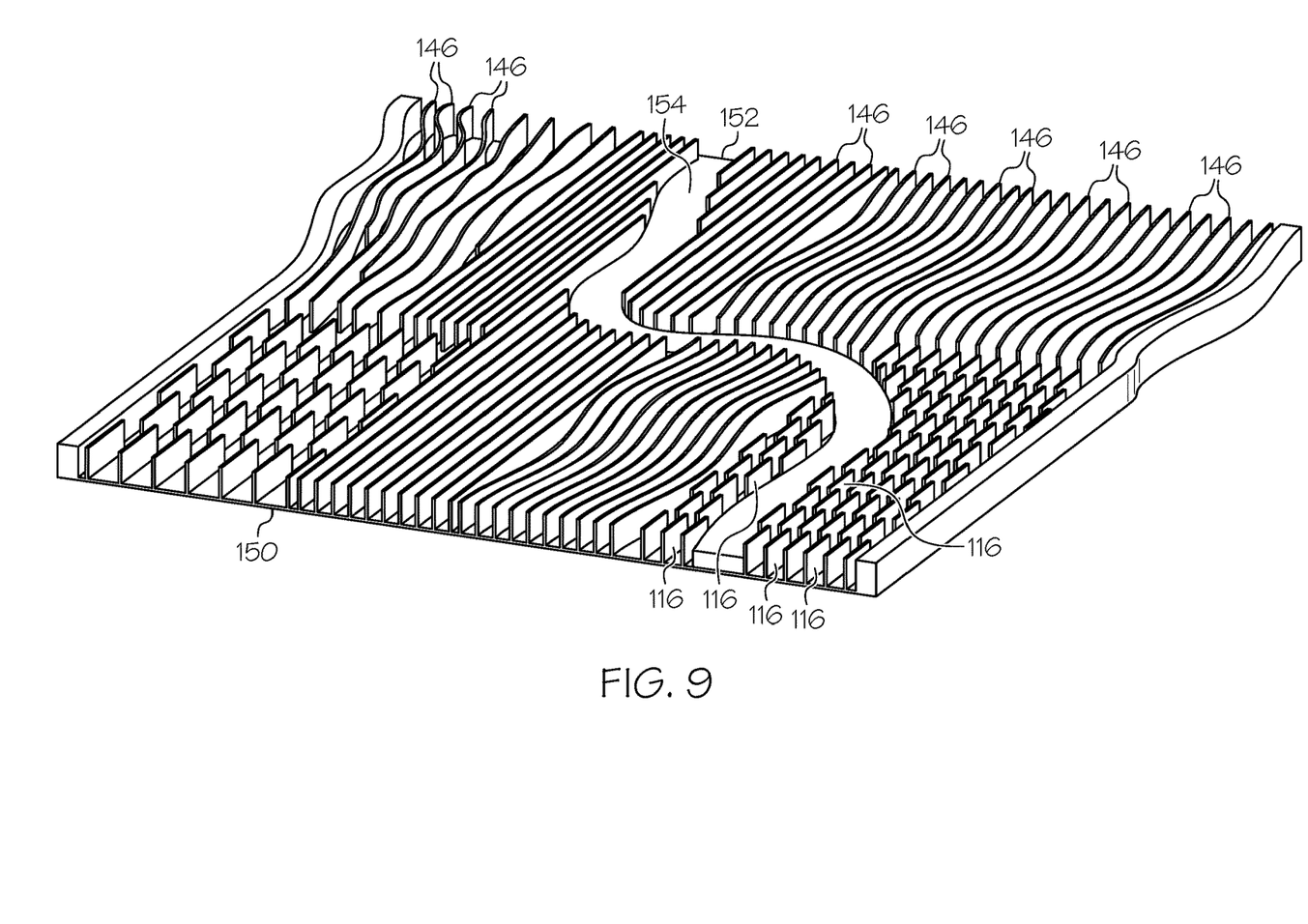
FIG. 9 is a perspective view of a heat transfer plate and de-icing channel in accordance with an embodiment of the invention.

Referring now to FIGS. 7 and 8, there are shown simplified views of exemplary embodiments of a heat transfer plate 140. The plate 140 may be non-rectilinear and may include a flow channeling segment 142 and a main heat transfer segment 144. Within the segment 144, fins 116 may be arranged in the configuration discussed above with respect to FIG. 5. Within the flow channeling segment 142, flow channeling fins 146 may be employed to concentrate fluid flow. The flow channeling fins 146 may have various configurations (e.g., curved fins, pin fins and/or offset fins). Referring now to FIG. 9, an exemplary embodiment of a heat transfer plate 150 may include a de-icing segment 152. A heat transfer plate such as the one illustrated in FIG. 9 may be particularly effective in aircraft applications. A fin type heat exchanger may be subject to ice formation when an aircraft is allowed to remain idle at ground level in a cold environment. Ice may form on closely spaced fins as water vapor condenses after cessation of airflow through the heat exchanger. When the aircraft is re-started, operation of the heat exchangers must be delayed until the heat exchanger is de-iced.

De-icing may be performed quickly when warm fluid passes through the de-icing segment 152. The de-icing segment 152 may not have any of the fins 116 or 146 connected thereto. Thus fluid, such as air, may pass unimpeded through a de-icing channel 154 formed between some of the fins 116 or 146 and the de-icing segment 152. The de-icing segment 152 and the corresponding de-icing channel 154 may have a length that exceeds an overall length of the plate 150. The de-icing channel may be constructed with various configurations. In an exemplary embodiment of FIG. 9, the de-icing channel 154 may be formed in a serpentine shape.

Advantageously, the serpentine shape facilitates de-icing fluid flow into a substantial area of the heat transfer plate 150. Thus the fins 116 and/or 146 may be quickly de-iced because a need to laterally transfer heat from one fin to the next may be minimized. In other words, the serpentine shaping of the de-icing channel 154, as compared to a straight line shape, may result in a reduction of lateral distance between the fins and the de-icing channel 154.

It may seen, from FIGS. 6, 7, 8 and 9, that the heat exchanger 100 may be constructed with various non-rectilinear elements. This non-rectilinear shaping of elements may provide advantageous operational features for the heat exchanger 100. As discussed above, a wide range of element shapes may be provided efficiently and cost-effectively by employing additive fabrication methods.

Figure 10:
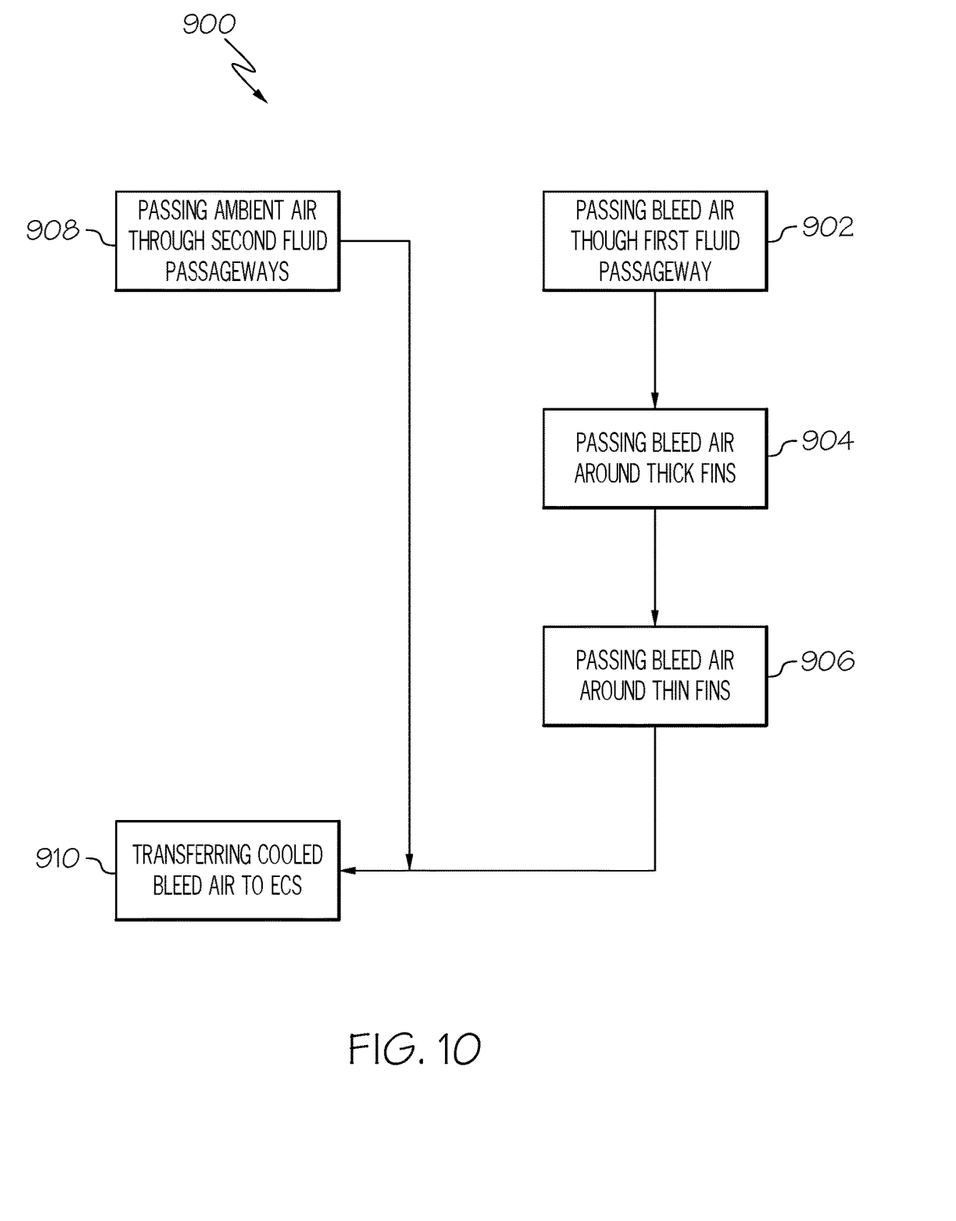
FIG. 10 is a flow chart of a method for cooling bleed air in accordance with an embodiment of the invention.

Referring now to FIG. 10, a flow chart illustrates an exemplary embodiment of a method 900 for cooling bleed air on an aircraft. In a step 902, bleed air may be passed into first fluid passageways of a heat exchanger (e.g., bleed air may be passed into fluid passageways 102). In a step 904, the bleed air may be passed around thick fins (e.g., the bleed air may pass around the fins 116 at the inlet end 108 of the first fluid passageway 102). In a step 906, the bleed air may be passed around thin fins (e.g., the bleed air may pass around the fins 116 at the outlet end 110 of the first fluid passageway 102). In a step 908 ambient air may be passed through second fluid passageways (e.g., ambient air may be passed through the fluid passageways 104). In a step 910 cooled bleed air may be transferred to a conventional environmental control system (ECS) of the aircraft.

It should be understood, of course, that the foregoing relates to exemplary embodiments of the invention and that modifications may be made without departing from the spirit and scope of the invention as set forth in the following claims.

We claim:

1. A heat exchanger comprising:
   at least one fluid passageway adjacent a heat transfer plate;
   an inlet end and an outlet end of the heat exchanger;
   wherein the heat transfer plate has a flow channeling segment adjacent the inlet end and a main heat transfer segment adjacent the outlet end;
   wherein the flow channeling segment has two opposing, straight, non-parallel sides;
   wherein the main heat transfer segment has two opposing, parallel sides joined to the non-parallel sides of the flow channeling segment;
   a plurality of rows of heat transfer elements on the main heat transfer segment;
   at least one row of flow channeling fins on the flow channeling segment;
   wherein the plurality of rows of heat transfer elements and the at least one row flow channeling fins are positioned in the at least one fluid passageway;
   wherein the at least one fluid passageway extends from the inlet end to the outlet end of the heat exchanger;
   wherein the at least one fluid passageway has a central portion, a first outer portion on a first side of the central portion, and a second outer portion on a second side of the central portion opposite the first side of the central portion;
   wherein the plurality of rows of heat transfer elements and the at least one row of the flow channeling fins are oriented orthogonally to the at least one fluid passageway;
   wherein the at least one row of flow channeling fins is positioned at an inlet end of the at least one fluid passageway;
   wherein the at least one row of flow channeling fins includes first curved fins and second curved fins;
   wherein the first curved fins are positioned in the first outer portion of the fluid passageway and shaped to direct fluid flow into the first outer portion;
   wherein the second curved fins are positioned in the second outer portion of the fluid passageway and shaped to direct fluid flow into the second outer portion;
   wherein the first curved fins are curved in a direction opposite to a direction of the second curved fins;
   wherein the heat transfer elements in a row adjacent to the flow channeling segment have first spaces between said heat transfer elements of the row adjacent the flow channeling segment;
   wherein the heat transfer elements in a row adjacent the outlet end of the at least one fluid passageway have second spaces between said heat transfer elements of the row adjacent the outlet end;
   wherein the first spaces are smaller than the second spaces.

2. The heat exchanger of claim 1 wherein all of the heat transfer elements are heat transfer fins oriented orthogonally to the heat transfer plate.

3. The heat exchanger of claim 1:
   wherein the heat transfer elements of the row adjacent the flow channeling segment have first thicknesses;
   wherein the heat transfer elements of the row adjacent the outlet end of the at least one fluid passageway have second thicknesses;
   wherein the first thicknesses are greater than the second thicknesses.

4. The heat exchanger of claim 1:
   wherein the heat transfer plate varies in thickness between the inlet end and the outlet end of the at least one fluid passageway; and
   wherein the at least one fluid passageway varies in height between the inlet end and the outlet end of the fluid passageway.

5. The heat exchanger of claim 2 wherein fillets are present at joining locations of the heat transfer fins and the heat transfer plate.

6. The heat exchanger of claim 5:
   wherein the fillets have a first radius at the joining locations of the heat transfer fins at the inlet end of the heat transfer plate;
   wherein the fillets have a second radius at the joining locations of the heat transfer fins at the outlet end of the heat transfer plate; and
   wherein the first radius is greater than the second radius.

7. The heat exchanger of claim 1:
   wherein the heat transfer plate has a first thickness at the inlet end of the at least one fluid passageway and has a second thickness at the outlet end of the at least one fluid passageway; and
   wherein the first thickness of the heat transfer plate is greater than the second thickness of the heat transfer plate.

* * * * *